United States Patent
Guštin

(10) Patent No.: US 10,535,209 B2
(45) Date of Patent: Jan. 14, 2020

(54) PASSIVE KEYLESS ENTRY SYSTEM FOR PREVENTING RELAY ATTACKS

(71) Applicant: NXP B.V., Eindhoven (NL)

(72) Inventor: Matjaž Guštin, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/041,579

(22) Filed: Jul. 20, 2018

(65) Prior Publication Data

US 2019/0114857 A1    Apr. 18, 2019

(30) Foreign Application Priority Data

Oct. 18, 2017 (EP) .................................... 17197146

(51) Int. Cl.
*G07C 9/00* (2006.01)
*B60R 25/24* (2013.01)

(52) U.S. Cl.
CPC ........ *G07C 9/00309* (2013.01); *B60R 25/245* (2013.01); *B60R 25/246* (2013.01); *G07C 9/00658* (2013.01); *G07C 2009/00396* (2013.01); *G07C 2009/00555* (2013.01)

(58) Field of Classification Search
CPC ............ G07C 9/00309; G07C 9/00658; G07C 2009/00396; G07C 2009/00555; G07C 9/00111; G07C 9/00007; B60R 25/245; B60R 25/246
See application file for complete search history.

(56) References Cited

U.S. PATENT DOCUMENTS

| | | | |
|---|---|---|---|
| 9,988,014 B2* | 6/2018 | Parasurama | B60R 25/245 |
| 10,124,768 B1* | 11/2018 | Bocca | G07C 9/00309 |
| 10,336,297 B2* | 7/2019 | Hamada | |
| 2016/0148448 A1* | 5/2016 | Blatz | B60R 25/24 340/5.61 |
| 2016/0275734 A1* | 9/2016 | Blatz | B60R 25/24 |
| 2016/0335897 A1* | 11/2016 | Naserian | G08G 1/161 |
| 2017/0158169 A1* | 6/2017 | Luo | B60R 25/245 |

FOREIGN PATENT DOCUMENTS

| | | |
|---|---|---|
| DE | 102011079421 A1 | 1/2013 |
| DE | 102015016553 A1 | 6/2017 |
| EP | 1403653 A1 | 3/2004 |
| WO | 2015084852 A1 | 6/2015 |

OTHER PUBLICATIONS

Microchip Technology Inc. "Atmel ATA5700 Status: In Production", 3 pgs. (2018).
Microchip Technology Inc. "Atmel ATA5702 Status: In Production", 3 pgs. (2018).
Microchip Technology Inc. "Press Release, Industry's Lowest-Power Vehicle Access Solution for Smart Keys and Nearables" 2 pgs. (Nov. 8, 2016).

* cited by examiner

*Primary Examiner* — Thomas D Alunkal
(74) *Attorney, Agent, or Firm* — Rajeev Madnawat

(57) ABSTRACT

A passive keyless entry (PKE) system is disclosed. The PKE includes an in-vehicle apparatus. The in-vehicle apparatus includes a control unit that is configured to measure magnetic field and compute at least one angle between two projections of the magnetic field. When the measured angle is lower than a threshold value, an authorization signal is prevented.

8 Claims, 4 Drawing Sheets

PASSIVE KEYLESS ENTRY SYSTEM FOR PREVENTING RELAY ATTACKS

CROSS-REFERENCE TO RELATED APPLICATIONS

This application claims the priority under 35 U.S.C. § 119 of European Patent application no. 17197146.8, filed on Oct. 18, 2017, the contents of which are incorporated by reference herein.

FIELD OF THE INVENTION

The present invention relates to a passive keyless entry system and to an authentication method for preventing relay attacks. Such systems and method could be advantageously applied for providing a secure access to a vehicle.

BACKGROUND OF THE INVENTION

Vehicles, in particular cars, currently on the market may be equipped with a Passive Keyless Entry (PKE) system, where approaching the car with the key is enough to unlock it, without the need to press the buttons on the key. Such type of key system is subject to security threats.

In particular, PKE systems based on low frequency radio (LF), typically 125 kHz, can be exploited with a Relay Station Attack (RSA). A RSA simply extends the range of the radio signals that a car and its key exchange. The final goal of the RSA is to unlock the car with a key out of the car's range, steal the car content and potentially the whole car.

A relay station is composed of two nodes: a receiving node that simply reads the radio signal next to one device (usually the car) and communicates it to the transmitting node, which transmits the signal as-is the other device (usually the key). The transmission content is not sniffed, modified nor forged. The result is an extension of the range of the radio signal between the two devices in one direction. Often bidirectional relaying is performed.

One specific type of RSA is called unidimensional (1D). In this type of attack the radio signal is measured by an antenna on the receiving relay node and transmitted by only one antenna on the transmitting relay node. Therefore, no matter what is the original magnetic field looks like (length, direction and sense of the field vector in the measured point) on the receiving node, the transmitting node will always create a field with the same shape (direction and sense of the field vector), variable only in the field strength (length of the field vector).

A simple countermeasure against a 1D RSA is to measure the angle between multiple fields. The key is usually equipped with a 3D LF receiving antenna with three coils oriented as in a right-handed 3D reference system (X, Y, Z) as it must receive in every possible orientation. Supposing that the key does not move or moves for a small enough distance during the whole process, the car activates two different LF antennas on its body in sequence, let's call them antenna A1 and antenna A2, which generate two different fields H1 and H2, being H1 and H2 two vectors. In any point around the car, the key would measure a vector $H1=(x_1, y_1, z_1)$ composed of the X, Y, and Z voltages (or RSSI values or magnetic field units) obtained from each coil of its 3D antenna and then $H2=(x_2, y_2, z_2)$.

The angle α between H1 and H2 could be computed with the following Formula A obtained by reversing the geometrical definition of the scalar (dot) product:

$$\alpha = \arccos((H1 \cdot H2)/(\|H1\|\|H2\|))$$

where $\|H1\|$ and $\|H2\|$ are respectively the modules of H1 and H2.

When the fields H1 and H2 are relayed with a 1D RSA, the relayed fields R1 and R2 will have the same shape and the measured vectors of the relayed fields will match in direction and sense. Consequently, the angle between R1 and R2 will be zero (in theory) or very small (in practice).

The above principle is used in DE 102011079421, disclosing a method and arrangement for the access and/or start-authentication. In such document a process for the access and/or start-authentication of a mobile identification sender with respect to a vehicle combines the measured components to verify the degree of parallelism of the respective field strength vectors, i.e. to verify if the angle between such vectors is zero.

Similarly, in WO 2015/084852 a passive entry system for an automotive vehicle is configured to prevent relay attacks by analyzing magnet vectors and angles created by a plurality of antennas mounted on the vehicle.

The above disclosed system and methods are therefore based on a measurement of the magnitude of the field (length of the vector) and of the orientation of the two magnetic field vectors H1 and H2 in an $R^3$ space. However, some PKE systems are designed mostly to measure the magnitude of the magnetic field (length of the vector), but not its orientation. The resulting value for each component of each magnetic field is the maximum magnitude of that component in absolute value, so without sign. In such systems, the measured vectors resemble a projection of the real field vectors H1 and H2 in the positive octant of the $R^3$ space.

OBJECT AND SUMMARY OF THE INVENTION

It is an object of the present invention to provide an efficient passive keyless entry system and an authentication method for preventing relay attacks, without needing the orientation of the vectors representing the magnetic field generated by at least two antennas.

In order to achieve the objects defined above, a passive keyless entry system and an authentication method for a passive keyless entry system according to the independent claims are provided. The dependent claims describe advantageous developments and modifications of the invention.

According to a first aspect of the present invention, a passive keyless entry system includes an in-vehicle apparatus installable on a vehicle and a portable apparatus, the in-vehicle apparatus including:
  a plurality of antennas for generating a plurality of respective magnetic fields,
  an in-vehicle receiver for communicating with a portable transmitter of the portable apparatus,
  an in-vehicle control unit for controlling the plurality of antennas and for generating an authorization signal based on information received from the portable apparatus, the portable apparatus including:
  a receiving antenna having three mutually orthogonal coils,
  a portable transmitter for communicating with the in-vehicle receiver,
  a portable control unit for controlling the receiving antenna and the portable transmitter,
  the portable apparatus being configured for measuring at least two projection vectors of the magnetic fields, the in-vehicle control unit or the portable control unit being configured for computing at least one computed angle between two projection vectors of the magnetic fields, the in-vehicle control unit or the portable control unit being configured for comparing the at least one computed angle with an angular threshold value, the in-vehicle control unit being configured for preventing the authorization signal when all the computed angles are lower than angular threshold value.

According to a second aspect of the present invention, an identification method for a passive keyless entry system includes:

a first step of measuring a first projection vector resembling a projection of a first magnetic field, a second step of measuring a second projection vector resembling a projection of a second magnetic field, a third step of computing a first computed angle between the first projection vector and the second projection vector, a fourth step of comparing the first computed angle with a predefined angular threshold value and generating an authorization signal if the condition $\alpha_t \leq \alpha_m$ is verified, the method further comprising, only if the condition $\alpha_t \leq \alpha_m$ is not verified:

a fifth step of measuring a third projection vector resembling a projection of a third magnetic field, a sixth step of computing a second computed angle between the first and the third projection vectors and a third computed angle between the second and the third projection vectors, a seventh step of comparing the second and third computed angles with the predefined angular threshold value and generating an authorization signal if the condition $\alpha_t \leq \alpha_{m13}$ or the condition $\alpha_t \leq \alpha_{m23}$ is verified or preventing the authorization signal if the condition $\alpha_t \leq \alpha_{m13}$ and condition $\alpha_t \leq \alpha_{m23}$ are both not verified.

Advantageously, the present invention allows to efficiently generating an authorization signal, also preventing the occurrence of false positive, without requiring the measuring of the exact orientation of the magnetic field vectors in an $R^3$ space. According to the present invention, the actual components of the vectors resembling the magnetic fields have to be measured only considering their magnitude, without the sign.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DESCRIPTION OF EMBODIMENTS

Figure 1:
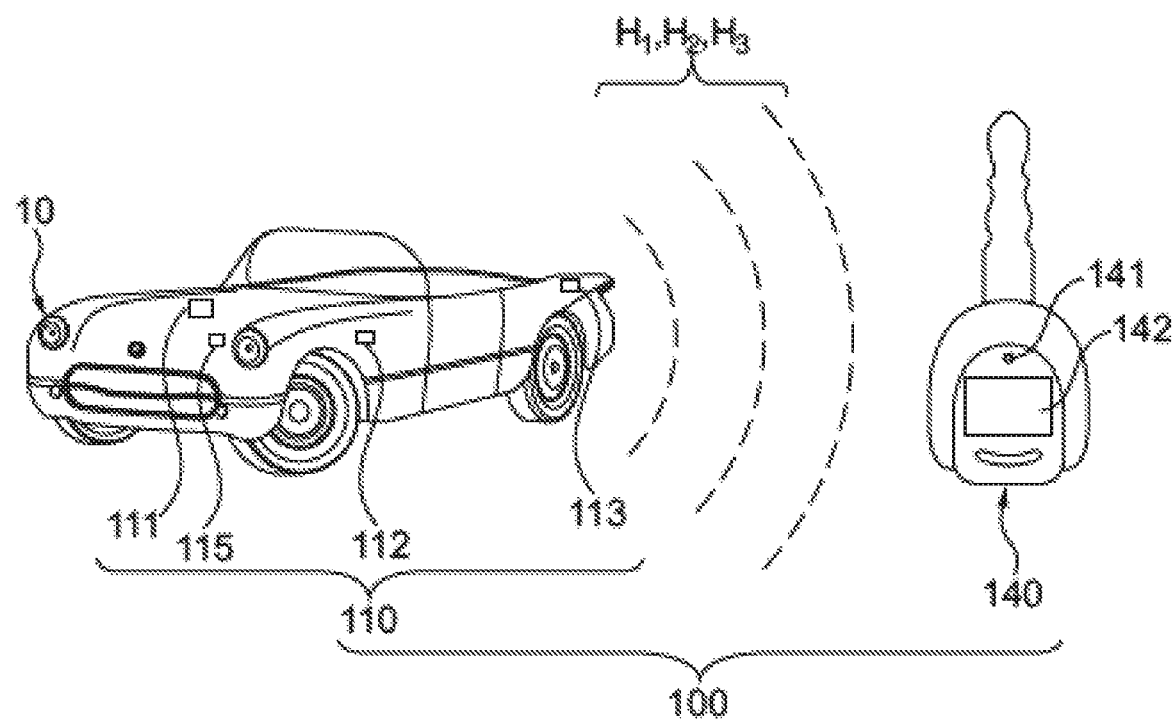
FIG. 1 shows a schematic view of a Passive Keyless Entry (PKE) system capable of preventing relay attacks according to the present invention.

FIG. 1 shows a vehicle 10 equipped with a Passive Keyless Entry (PKE) system 100. The PKE system 100 includes an in-vehicle apparatus 110 that is provided in the vehicle 100 and a portable apparatus 140.

The in-vehicle apparatus 110 includes:
a plurality of antennas 111, 112, 113 for generating a plurality of respective magnetic fields H1, H2, H3,
an in-vehicle receiver for communicating with a portable transmitter of the portable apparatus 140, and
an in-vehicle control unit 115 for controlling the plurality of antennas 111, 112, 113 and which upon communication with the portable apparatus 140 generates an authorization signal, for example opening the doors of the vehicle 10, based on information received from the portable apparatus 140.

According to different embodiments of the present invention the in-vehicle apparatus 110 may include two, three or more than three antennas.

The portable apparatus 140 includes:
a 3D LF receiving antenna 141 having three mutually orthogonal coils 141x, 141y and 141z oriented as in a right-handed 3D reference system (X, Y, Z),
a portable transmitter for communicating with the in-vehicle receiver,
a portable control unit 142 for controlling the receiving antenna 141 and the portable transmitter.

According to embodiments of the present invention, the portable apparatus 140 is shaped as a key.

Figure 6:
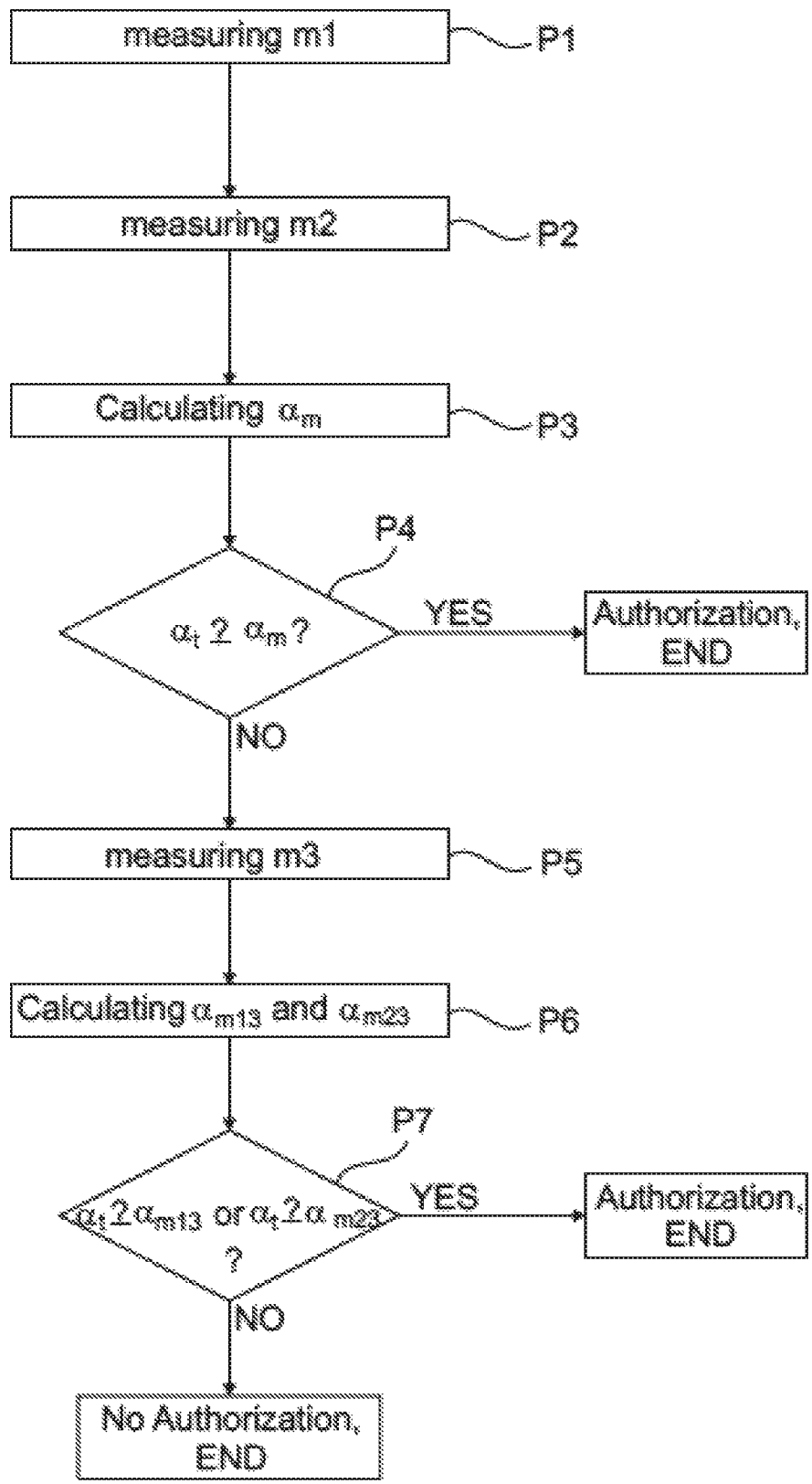
FIG. 6 shows a block diagram of an authorization method for preventing relay attacks according to the present invention.

The PKE system 100 operates according to the PKE identification method below described and represented in FIG. 6.

Figure 2:
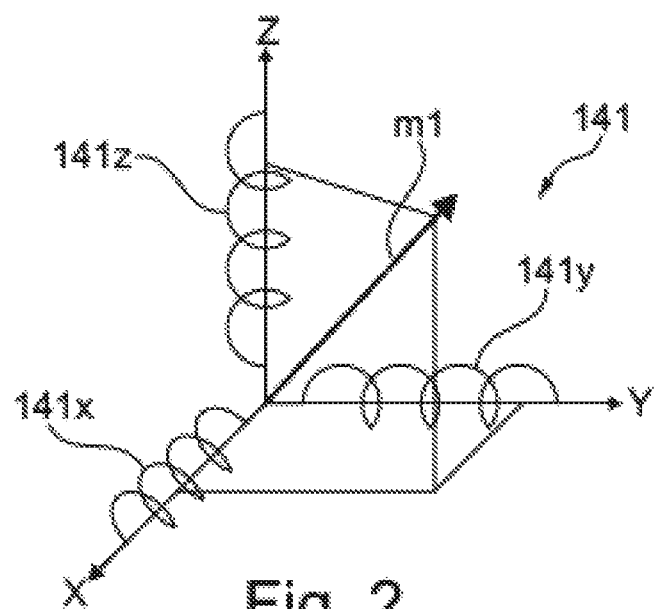
FIG. 2 shows a schematic view of a 3D LF receiving antenna equipping the key of the PKE of FIG. 1.

The identification method includes a first step P1 of measuring the magnitude of the vector representing the first magnetic field H1 generated by a first antenna 111 of the in-vehicle apparatus 110. The orientation of the vector representing the magnetic field H1 is not measured. Accordingly, the first projection vector m1 which is actually measured resembles a projection of the real magnetic field vector H1 in the positive octant of an $R^3$ space defined by the coils 141x, 141y and 141z, as represented in FIG. 2. The actual components of the real magnetic field vector H1 in the $R^3$ space are measured only considering their magnitude, without the sign.

The first step P1 of measuring the first projection vector m1 includes the following sub-steps:
in a first sub-step the in-vehicle control unit 115 activates the first antenna 111 of the in-vehicle apparatus 110,
in a second sub-step the portable apparatus 140 measures the first projection vector m1 by means of the receiving antenna 141,
in a third optional sub-step the portable transmitter transmits the measured first projection vector m1 to the in-vehicle receiver.

The identification method includes a subsequent second step P2 of measuring the magnitude of the vector representing the second magnetic field H2 generated by a second antenna 112 of the in-vehicle apparatus 110. The second step P2 is analogous to the first step including the following sub-steps:

in a first sub-step the in-vehicle control unit 115 activates the second antenna 112 of the in-vehicle apparatus 110,
  in a second sub-step the portable apparatus 140 measures the second projection vector m2 by means of the receiving antenna 141. The measured second projection vector m2 resembles a projection of the real magnetic field vector H2 in the positive octant of the $R^3$ space defined by the coils 141x, 141y and 141z,
  in a third optional sub-step the portable transmitter transmits the measured second projection vector m2 to the in-vehicle receiver.

The identification method includes a subsequent third step P3 of computing a first computed angle $\alpha_m$ between the measured projection vectors m1 and m2 as per the Formula A:

$$\alpha_m = \arccos((m1 \cdot m2)/(\|m1\|\|m2\|))$$

Additional computational optimization may be added e.g. by not computing the arccos function and working with cos values ($\cos \alpha = (m1 \cdot m2)/(\|m1\|\|m2\|)$) instead of angles.

According to a possible embodiment of the present invention the third step P3 of computing the angle $\alpha_m$ is performed in the in-vehicle control unit. According to a possible embodiment of the present invention the third step P3 of computing the angle $\alpha_m$ is performed in the portable control unit 142. In the latter embodiment the third sub-steps of the first and second step P1, P2 of the method are not required.

Figure 4:
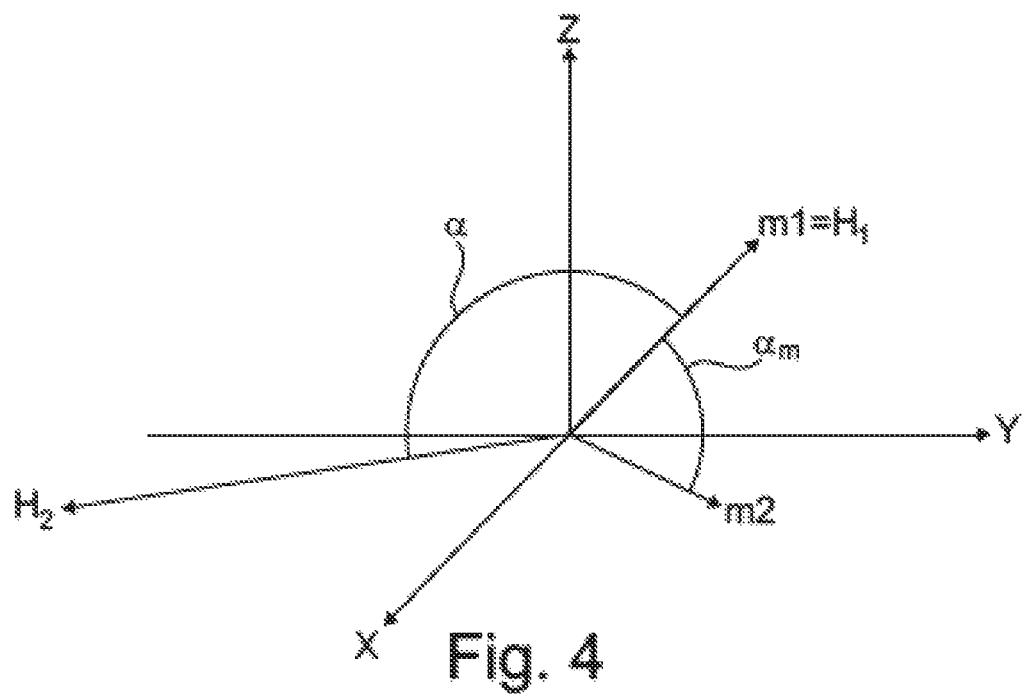
FIG. 4 shows a first schematic representation of two vectors respectively representing two different magnetic fields generated by two respective antennas, which are distanced from one another, and of their respective projections in the first octant of an $R^3$ space.

The identification method includes a subsequent fourth step P4 where the first computed angle between the measured vectors m1 and m2 is compared with a predefined angular threshold value $\alpha_t$. A very small angle $\alpha_t$ will be defined as a convenient threshold to be compared to the measured angle $\alpha$. If $\alpha_t \leq \alpha_m$, then the angle $\alpha$ between the real magnetic field vector H1 and H2 is greater than $\alpha_t$. It can be actually demonstrated that, as represented in FIG. 4, the following formula B is verified:

$$\alpha_m \leq \alpha$$

Therefore, if the condition $\alpha_t \leq \alpha_m$ is verified no unidimensional RSA (Relay Station Attack) is detected and the in-vehicle control unit 115 generates the authorization signal, which, for example, authorizes access to the vehicle 10. Consequently the authorization method is ended.

According to possible embodiments of the present invention the fourth step P4 may be performed the in-vehicle control unit or in the portable control unit 142. In the latter case the fourth step P4 includes a sub-step of transmitting the result of the comparison of the fourth step P4 to the in-vehicle receiver, in order that the in-vehicle control unit 115 can generate the authorization signal, if the condition $\alpha_t \leq \alpha_m$ is verified.

Figure 5:
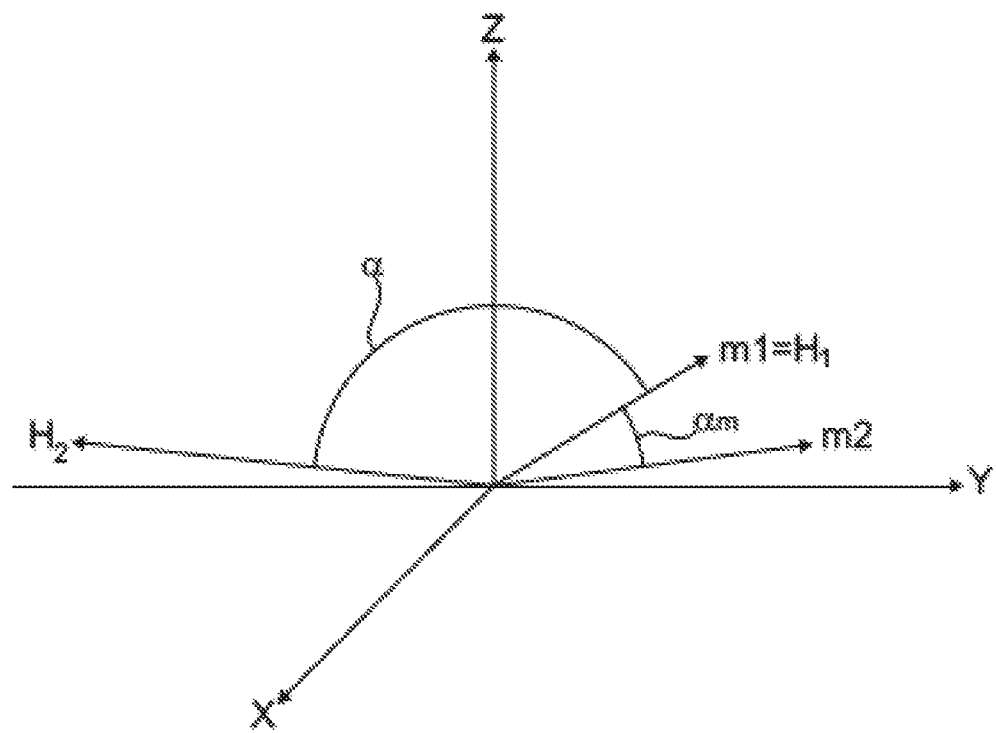
FIG. 5 shows a second schematic representation of other two vectors respectively representing two different magnetic fields generated by two respective antennas, which distanced from one another.

Otherwise, if the condition $\alpha_t \leq \alpha_m$ is not verified it may nevertheless be that $\alpha_t \leq \alpha$, as represented in FIG. 5, where to angle $\alpha$ much bigger than the threshold value $\alpha_t$ corresponds a very small value of the first computed angle $\alpha_m$. To verify the occurrence of such false positive (i.e. the PKE system deciding that there is an attack occurring when there is none, preventing the vehicle owner to open it) the identification method continues with a subsequent fifth step P5 of measuring the magnitude of the vector representing the third magnetic field H3 generated by a third antenna 113 of the in-vehicle apparatus 110.

The fifth step P5 is analogous to the first and the second steps including the following sub-steps:

in a first sub-step the in-vehicle control unit 115 activates the second antenna 113 of the in-vehicle apparatus 110,
  in a second sub-step the portable apparatus 140 measures the third projection vector m3 by means of the receiving antenna 141. The measured third projection vector m3 resembles a projection of the real magnetic field vector H3 in the positive octant of the $R^3$ space defined by the coils 141x, 141y and 141z,
  in a third optional sub-step the portable transmitter transmits the measured third projection vector m3 to the in-vehicle receiver.

The identification method includes a subsequent sixth step P6 of computing a second computed angle $\alpha_{m13}$ between the first and third projection vectors m1 and m3 and a third computed angle $\alpha_{m23}$ between the second and third projection vectors m2 and m3. Both second and third computed angles $\alpha_{m13}$ and $\alpha_{m23}$ are computed as per the Formula A.

Similarly to the third step P3, also the sixth step P6 may be performed in the in-vehicle control unit or in the portable control unit 142. In the latter case the third sub-step of the fifth step P5 of the method is not required.

The identification method includes a subsequent seventh step P7 where the second and third computed angles $\alpha_{m13}$ and $\alpha_{m23}$ between the couple of measured projection vectors m1, m3 and m2, m3 are both compared with the predefined angular threshold value $\alpha_t$. If the condition $\alpha_t \leq \alpha_{m13}$ or the condition $\alpha_t \leq \alpha_{m23}$ is verified no unidimensional RSA (Relay Station Attack) is detected and the in-vehicle control unit 115 generates the authorization signal, which, for example, authorizes access to the vehicle 10. Consequently the authorization method is ended.

Otherwise, it is supposed that the measured projection vectors m1, m3 and m2, m3 and the corresponding vectors of the magnetic field H1, H2, H3 are parallel or almost parallel to each other and therefore a unidimensional RSA (Relay Station Attack) is detected and the in-vehicle control unit 115 denies authorization to access the vehicle 10.

Similarly to the third step P4, also the seventh step P7 may be performed in the in-vehicle control unit or in the portable control unit 142. In the latter case the seventh step P7 includes a sub-step of transmitting the result of the comparison of the seventh step P7 to the in-vehicle receiver, in order that the in-vehicle control unit 115 can generate or prevent the authorization signal, depending on the result of the comparison performed in the above described seventh step P7.

The in-vehicle control unit 115 prevents the authorization signal, for example denying authorization to access the vehicle 10, when all the computed angles $\alpha_m$, $\alpha_{m13}$, $\alpha_{m23}$ are lower than angular threshold value $\alpha_t$.

Figure 3:
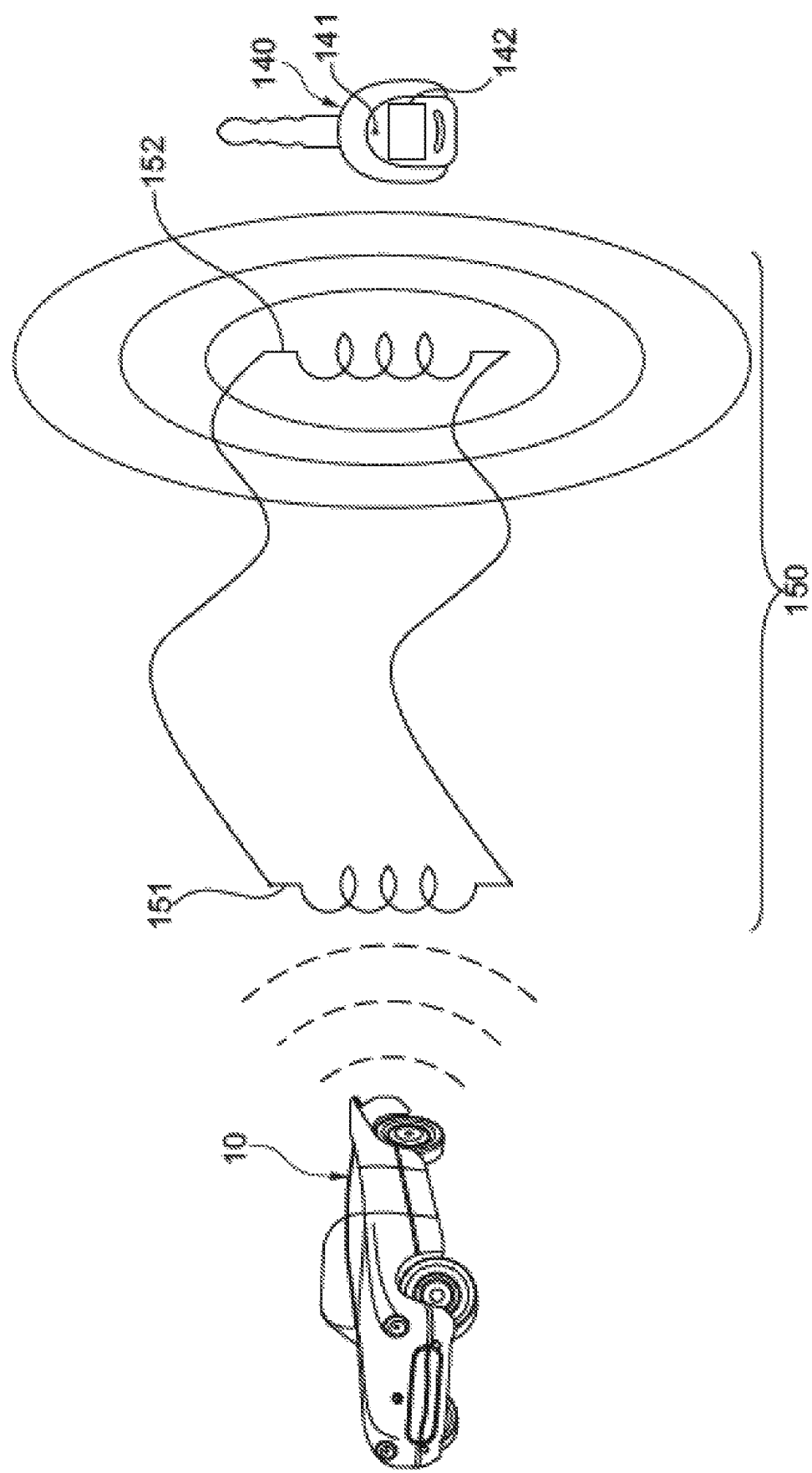
FIG. 3 shows a schematic view of the vehicle control system of FIG. 1 and of a Relay Station Attack (RSA) trying to exploit the Passive Keyless Entry (PKE) system of FIG. 1.

Such situation occurs when a unidimensional RSA 150 is present as represented in FIG. 3.

The RSA is composed of two nodes 151, 152: a receiving node 151 including only one antenna that simply reads the radio signal from the antennas 111, 112, 113 and communicates it to the transmitting node 152 also including only one antenna, which transmits the signal as-is the portable apparatus 140. The transmission content is not sniffed, modified nor forged. The result is an extension of the range of the radio signal between the two devices in one direction. Being the RSA 150 unidimensional, no matter what the original magnetic fields generated by the antennas 111, 112, 113 look like (length, direction and sense of the field vector in the measured point) on the receiving node 151, the transmitting node 152 will always create a field with the same shape (direction and sense of the field vector), variable only in the field strength (length of the field vector). Therefore the measured vectors m1, m3 and m2, m3 will be parallel and the conditions $\alpha_t \leq \alpha_m$, $\alpha_t \leq \alpha_{m13}$ and $\alpha_t \leq \alpha_{m23}$ will be never satisfied.

REFERENCE NUMERALS

10: vehicle,
100: Passive Keyless Entry (PKE) system
110: in-vehicle apparatus a portable apparatus
111, 112, 113: antennas
115: in-vehicle control unit
H1, H2, H3: magnetic fields generated by the antennas 111, 112, 113
m1, m2, m3: measured projection vectors corresponding to the magnetic fields H1, H2, H3
140: portable apparatus
141: receiving antenna
141x, 141y, 141z: coils of the receiving antenna
142: portable control unit
150: RSA (Relay Station Attack)
151: receiving node of the RSA (Relay Station Attack)
152: transmitting node of the RSA (Relay Station Attack)
M1, M2, M3, M4, M5, M6, M7: steps of the identification method
$\alpha_m$, $\alpha_{m13}$, $\alpha_{m23}$: computed angle between projection vectors m1, m2, m3

The invention claimed is:

1. A passive keyless entry system including an in-vehicle apparatus installable on a vehicle and a portable apparatus, the in-vehicle apparatus including:
a plurality of antennas configured to generate a plurality of respective magnetic fields,
an in-vehicle receiver configured to communicate with a portable transmitter of the portable apparatus,
an in-vehicle control unit configured to control the plurality of antennas and generate an authorization signal based on information received from the portable apparatus, and
the portable apparatus including:
a receiving antenna having three mutually orthogonal coils,
the portable transmitter configured to communicate with the in-vehicle receiver, and
a portable control unit configured to control the receiving antenna and the portable transmitter, the portable apparatus being configured to measure at least two projection vectors of the magnetic fields, the in-vehicle control unit or the portable control unit is configured to compute a plurality of angles between two projection vectors based upon the plurality of respective magnetic fields, the in-vehicle control unit or the portable control unit is configured to compare each computed angle with an angular threshold value, and prevent the authorization signal when all of the computed angles are lower than the angular threshold value.

2. The passive keyless entry system according to claim 1, wherein the in-vehicle apparatus further includes:
at least three antennas configured to generate three respective magnetic fields, wherein the in-vehicle control unit or the portable control unit is configured to compute three computed angles, each computed angle being comprised between two different projection vectors of the three respective magnetic fields, and the in-vehicle control unit is configured to prevent the authorization signal when all of the three computed angles are lower than the angular threshold value.

3. The passive keyless entry system according to claim 1, wherein the portable apparatus is configured to send the at least two projection vectors of the magnetic fields to the in-vehicle control unit, and the in-vehicle control unit is configured to
compute at least one computed angle between two projection vectors of the magnetic fields, and
compare the at least one computed angle with the angular threshold value.

4. The passive keyless entry system according to claim 1, wherein the in-vehicle control unit and the portable control unit are configured to compute a first computed angle between two projections of two magnetic fields, and the in-vehicle control unit is configured to allow the authorization signal when the first computed angle is greater than or equals the angular threshold value.

5. The passive keyless entry system according to claim 1, wherein the portable apparatus is configured to measure at least two projection vectors of the magnetic fields after the in-vehicle control unit has activated the corresponding antennas of the in-vehicle apparatus.

6. The passive keyless entry system according to claim 5, wherein the portable transmitter is configured to transmit the projection vectors to the in-vehicle receiver.

7. An identification method for a passive keyless entry system including:
measuring a first projection vector resembling a projection of a first magnetic field;
measuring a second projection vector resembling a projection of a second magnetic field;
computing a first computed angle between the first projection vector and the second projection vector;
comparing the first computed angle with a predefined angular threshold value generating an authorization signal after the condition is verified;
after the condition is not verified:
measuring a third projection vector resembling a projection of a third magnetic field;
computing a second computed angle between the first and the third projection vectors and a third computed angle between the second and the third projection vectors;
comparing the second and third computed angles with the predefined angular threshold value and generating an authorization signal after the condition is verified; and
preventing the authorization signal after the condition is not verified.

8. The identification method according to claim 7, wherein any of the projection vectors resembles a projection of the respective magnetic field vector in a positive octant of an $R^3$ space, wherein actual components of the respective magnetic field vector are being measured only considering their magnitude without the sign.

* * * * *